United States Patent [19]

Jaeger et al.

[11] Patent Number: 6,147,140
[45] Date of Patent: Nov. 14, 2000

[54] PHASE CHANGE INK COMPOSITION

[75] Inventors: C. Wayne Jaeger, Beaverton; Clifford R. King, Salem, both of Oreg.

[73] Assignee: Xerox Corporation, Stamford, Conn.

[21] Appl. No.: 09/222,021

[22] Filed: Dec. 29, 1998

Related U.S. Application Data

[62] Division of application No. 08/916,588, Aug. 22, 1997.

[51] Int. Cl.⁷ .......................... C09D 11/10; C08L 75/04; B41J 2/01; B41J 2/205
[52] U.S. Cl. .......................... 523/160; 347/99; 347/103; 524/589
[58] Field of Search .......................... 523/160, 161; 106/31.6, 31.28; 347/99, 100, 101, 103, 105, 106; 524/589, 590

[56] References Cited

U.S. PATENT DOCUMENTS

| | | | |
|---|---|---|---|
| 4,889,560 | 12/1989 | Jaeger et al. | 106/27 |
| 5,000,786 | 3/1991 | Matsuzaki | 106/27 |
| 5,372,852 | 12/1994 | Titterington et al. | 427/288 |
| 5,389,958 | 2/1995 | Bui et al. | 347/103 |
| 5,731,398 | 3/1998 | Ragsdale et al. | 528/73 |
| 5,750,604 | 5/1998 | Banning et al. | 524/187 |
| 5,780,528 | 7/1998 | Titterington et al. | 523/161 |
| 5,803,942 | 11/1998 | King et al. | 524/590 |
| 5,821,956 | 10/1998 | Kroon et al. | 347/43 |
| 5,966,150 | 10/1999 | Lester et al. | 347/43 |

OTHER PUBLICATIONS

Colour Index, vol. 5, 1975, pp. 5145, 5284 and 5285.
The Printing Ink Manual, 5th Edition, pp. 86–139, Date: 1993.

*Primary Examiner*—Vasu Jagannathan
*Assistant Examiner*—Callie E. Shosho
*Attorney, Agent, or Firm*—Oliff & Berridge, PLC

[57] ABSTRACT

A phase change ink composition comprising a phase change ink carrier system in combination with a compatible colorant system, the colorant system comprising a combination of (1) a black colorant having an absorbance in the 475 nanometer region which is less than 80 percent of the absorbance at the 580 nanometer region and (2) a sufficient amount of at least one other colorant having an absorbance in the 475 nanometer region whereby the colorant has a ratio of absorbance in the 475 nanometer region to the 580 nanometer region from about 0.92:1.0 to about 1.01:1.0

18 Claims, 5 Drawing Sheets

PHASE CHANGE INK COMPOSITION

This application is a divisional of U.S. patent application Ser. No. 08/916,588, filed Aug. 22, 1997.

BACKGROUND OF THE INVENTION

1. Field of the Invention

The present invention relates to a specific phase change ink composition that is useful for printing on various substrates, particularly transparencies, to produce high quality medical images such as x-ray, ultrasound, nuclear medicine, magnetic resonance, computer tomography, positron emission tomography, and angiography. In particular, the present invention relates to a phase change ink which may be used to create images that match the print quality and perceived appearance of black silver halide medical images. The ink is formulated by combining a black colorant, preferably a dye, having a deficient low absorbance region in the human visible response spectrum with at least one other colorant, preferably a dye, having a high absorbance region corresponding to the deficient low absorbance region of the black dye.

2. Background of the Invention

X-ray photographic films have long been used in medical imaging to help perform medical diagnoses. The black color generated from the development of silver halide photographic film has a somewhat brownish-black hue. A majority of the medical imaging photographic films today are produced on a blue tinted polyester transparent support to produce a more neutral black shade upon development of the silver halide film. Radiologists have been trained to read these films by looking for subtle gradations in optical densities in this particular black shade. Silver halide films for medical imaging have proven extremely useful in making medical diagnoses. However, the use of silver halide compositions for medical imaging has several disadvantages. These unimaged films are expensive, have limited shelf life, must be protected from light and other radiation, require chemical wet processing to develop an image, and disposal of the development chemicals employed raise environmental concerns.

It has been proposed to use in an ink jet imaging system commercially available phase change ink compositions having a black dye colorant on non-silver halide x-ray substrates having the same blue-tint or a clear or opaque appearance in medical diagnostic imaging applications.

It has been found that the resulting non-silver halide-containing films imaged with phase change ink in an ink jet imaging system are of diagnostic quality; however, the black color is different than what radiologists are accustomed to viewing. It was determined this different color (i.e. a bluish-black shade on the standard blue-tinted x-ray substrate) is due to great differences in the absorbance of the black dye over the visible wavelength spectrum from about 380 nanometers (nm) to about 670 nm compared to the absorbance of images generated on silver halide containing film. For example, with a standard black dye, such as Color Index (C.I.) Solvent Black 45, there are high and low absorbance regions. Furthermore, the absorbance in the 475 nm region was only about 60–70 percent of the absorbance in the 580 nm region. Accordingly, more light passes through the imaged substrate in the low absorbance region than in the higher absorbance region, causing an unintended shading difference on the imaged film substrate, again compared to an image created on a silver halide film.

Therefore, there is a need for an improved phase change ink composition which overcomes this problem created by the attempted use of commercially available black phase change ink for use on non-silver halide photographic film in medical diagnostic imaging applications.

BRIEF SUMMARY OF THE INVENTION

Accordingly, one aspect of the present invention is directed to a phase change ink composition comprising a phase change ink base in combination with a lightfast, thermally stable compatible black colorant system that includes a black coloring agent having at least one low absorbance region and at least one high absorbance region in the visible spectrum and at least one other coloring agent having a high absorbance band in the low absorbance region of the black coloring agent.

It is another aspect of the present invention that the colorant system comprises a combination of (1) a black coloring agent having an absorbance in the 475 nanometer region which is less than 80% of the absorbance at the 580 nanometer region and (2) a sufficient amount of at least one other color agent having an absorbance in the 475 nanometer region whereby the colorant system has a ratio of absorbances in the 475 nanometer region to the 580 nanometer region from about 0.92:1.0 to about 1.01:1.0.

Another aspect of the present invention is directed to a printed substrate comprising a substrate that has this phase change ink printed thereon.

It is a feature of the present invention that a black coloring agent and another coloring agent are combined in a phase change ink to obtain the desired optical density in the final imaged non-silver halide-containing transparency film for use in medical diagnostic imaging applications.

It is a preferred feature of the present invention that the second coloring agent combined with the black coloring agent in the phase change ink is an orange dye.

It is another feature of the present invention that the ratio of the dyes comprising the colorant system when incorporated into an ink can be adjusted to yield an absorbance spectrum comparable to the absorbance spectrum on silver halide films between about 380 nanometers and about 650 nanometers.

It is still another feature of the present invention that the image produced from the phase change inks incorporating the black colorant system duplicates the silver halide black color perceived by the human eye when observed in the environment in which the medical images are normally viewed on a fluorescent lightbox.

It is an advantage of the present invention that the phase change ink produced from the combining of a process or composite black colorant, such as dye, and another colorant, such as dye, with a phase change ink base can be used in an ink jet imaging system that is environmentally friendly and a relatively low cost alternative imaging system to the chemical wet processing system using silver halide photographic film currently employed in medical diagnostic imaging.

It is another advantage of the present invention that the phase change inks employing the compatible black colorant system manifest no precipitates or print head ink jet orifice clogging when used in an ink jet printer.

It is another advantage of the present invention that the black colorant system is compatible in a phase change ink when used in an ink jet printer in medical diagnostic imaging applications.

It is a further advantage of the present invention that the black colorant system is stationary and does not migrate over time in the imaged areas.

It is still a further advantage of the present invention that none of the dyes in the black colorant system bloom; that is, no dye crystallizes and migrates to the surface manifesting itself as a dust-like powder on the surface of the printed image.

These and other aspects, features and advantages are obtained in the ink of the present invention by the combining of a black coloring agent such as a dye having a low absorbance region with at least a second coloring agent such as a dye having a high absorbance region corresponding to the low absorbance region of the black coloring agent to produce an ink that is useful in ink jet medical diagnostic imaging applications to create images with black colored regions in the human visible response spectrum of from about 380 to about 670 nanometers that are comparable to images produced using black silver halide photographic film when viewed using a fluorescent light source typically used by radiologists.

BRIEF DESCRIPTION OF THE DRAWINGS

These and other aspects, features and advantages will become apparent upon consideration of the following detailed disclosure of the invention, especially when it is taken in conjunction with the accompanying drawings wherein.

DETAILED DESCRIPTION OF THE PREFERRED EMBODIMENT

As used herein, the following terms will be understood to mean the following:

A compatible black colorant system means at least one coloring agent that is black in color and which is chemically and physically compatible (e.g. non-reactive and soluble) with the phase change ink base and the coloring agents or colorants themselves. It is to be understood that the black coloring agent used in the compatible black colorant system can be a process black (a single colorant) or a composite black (a blend of colorants). Lightfast means the colorant system is resistant to fading upon exposure to light. Thermally stable means the colorant system will not discolor, readily oxidize or otherwise react at operating temperatures of the ink jet printing system.

Figure 1:
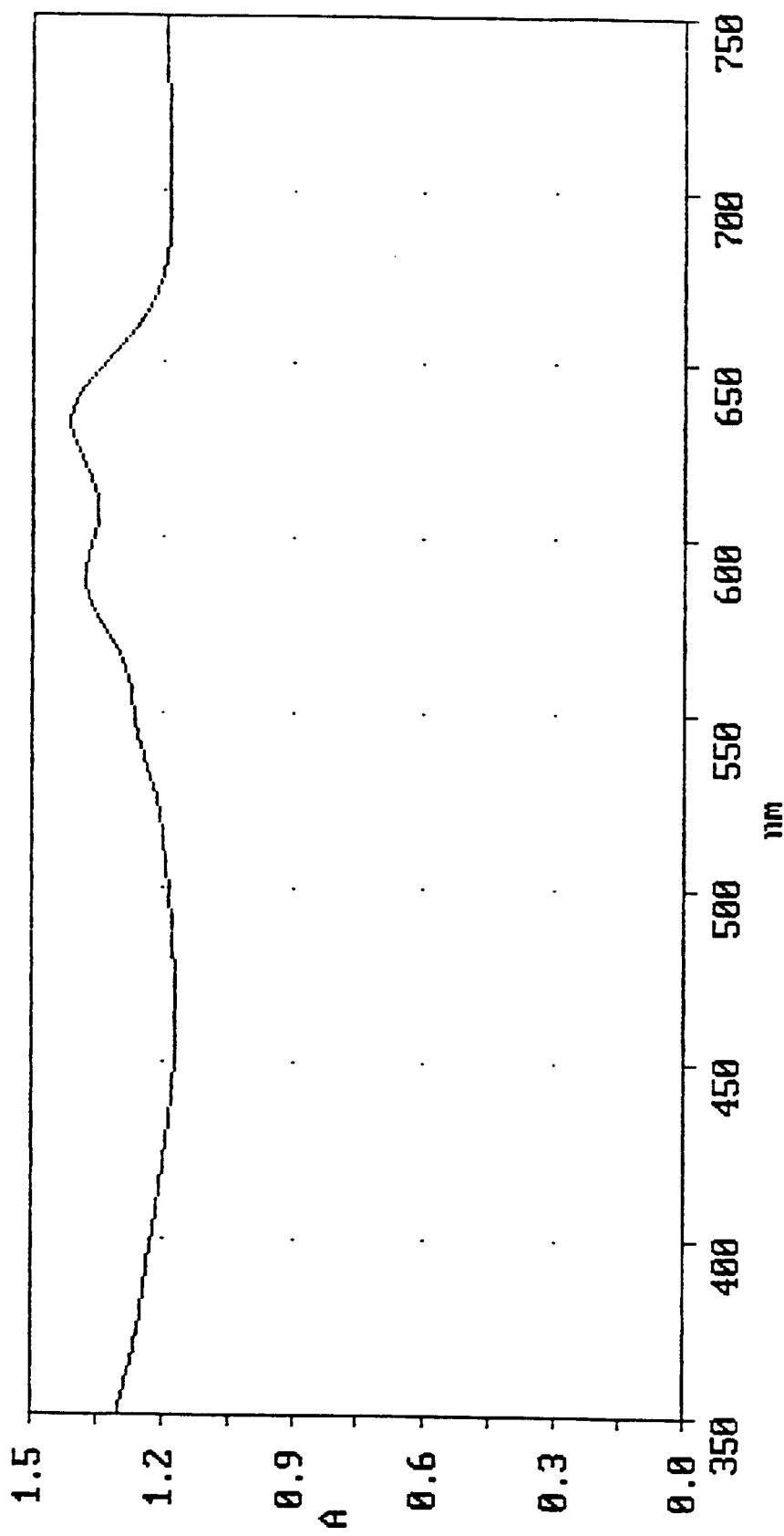
FIG. 1 is a graphical illustration of a visible absorbance spectrum of a prior art silver halide black x-ray image on a blue tinted polyester base film that is currently used in medical diagnostic imaging.
Figure 2:
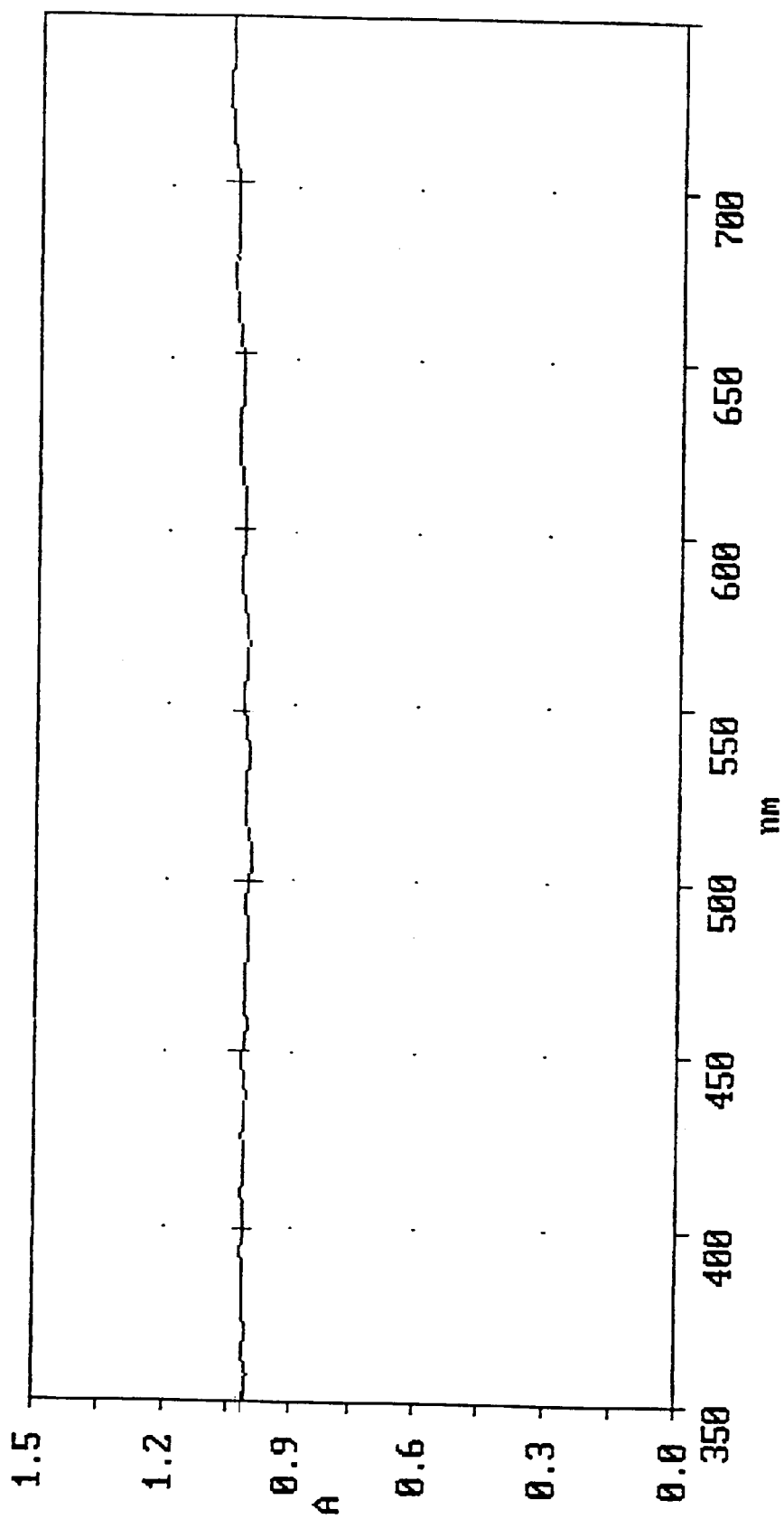
FIG. 2 is a graphical illustration of a visible absorbance spectrum of a prior art silver halide black image on a clear polyester base film that is also currently used in medical diagnostic imaging.
Figure 3:
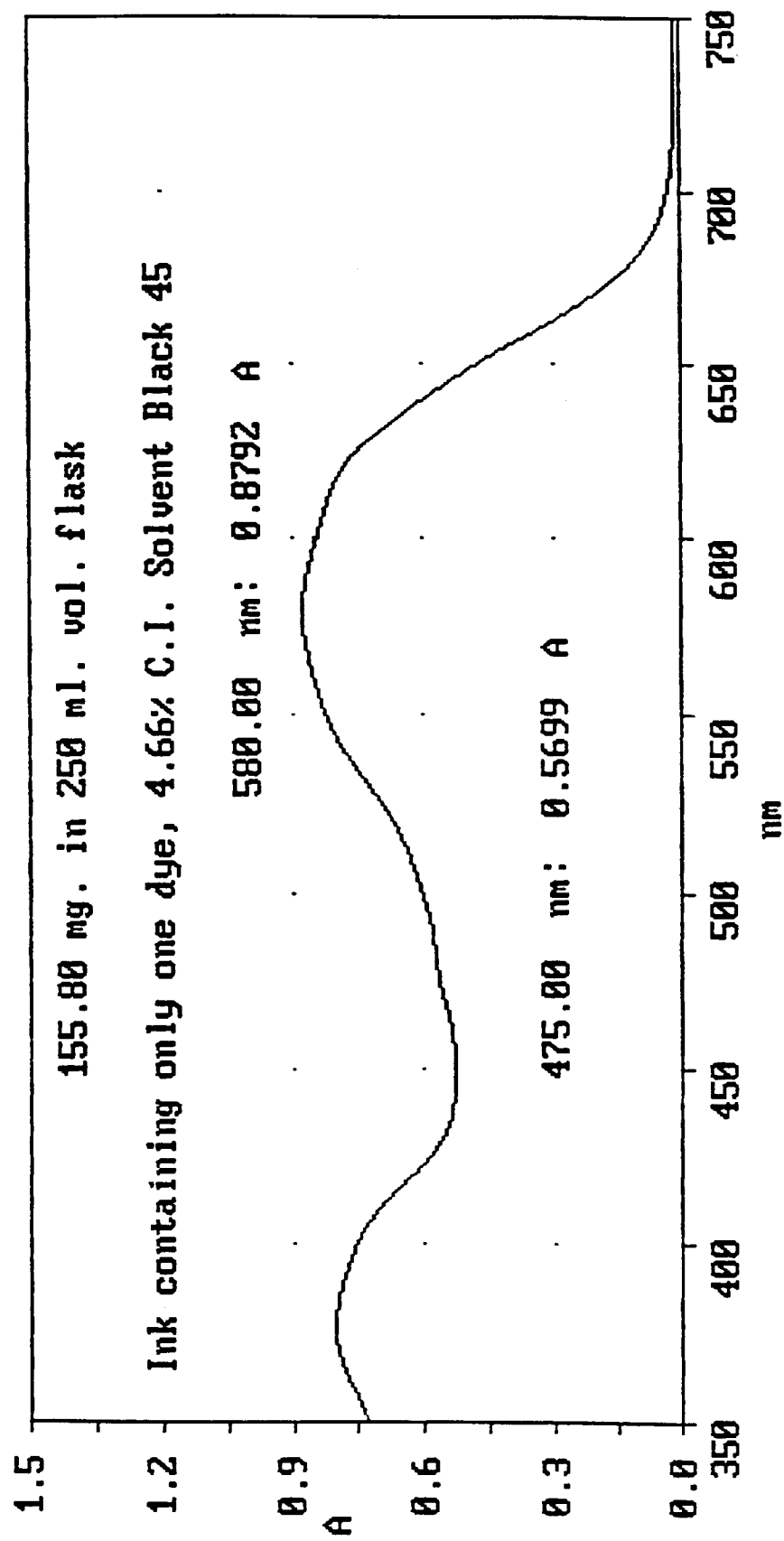
FIG. 3 is a graphical illustration of a visible absorbance spectrum of a phase change ink containing only a single black dye (C.I. Solvent Black 45) measuring relative absorbance versus wavelength and showing a low absorbance region between about 425 and about 525 nanometers.

Low absorbance region and high absorbance region mean the absorbance of light in the low absorbance region in the human visible response spectrum is less than about 80% of the absorbance of light in the high absorbance region of the human visible response spectrum for colorants used in the present invention. This is illustrated in FIG. 3 wherein the black dye spectrum has a low absorbance region from about 425 to about 525 nanometers (nm) and has high absorbance regions from about 350 to about 400 nm and from about 550 to about 630 nm. It shall be noted that the human visible response is only significant from about 400 to about 670 nm.

Additionally, compatibility preferably includes colorants that are non-blooming and tinctorially strong. Non-blooming means that no colorant will crystallize and migrate to the surface manifesting itself by a dust-like powder on the surface of the printed image. Non-migrating means that one colorant, such as a dye, will not migrate over time within the imaged areas, for example, from a dark area to a clear or light area. Tinctorially strong means a colorant that produces strong absorbance per unit weight or a very deep (optically dense) color from a minimum amount of colorant. Colorant or coloring agent will be understood to preferably include dyes, but could as well include appropriate pigments, colored isocyanate-derived urethane waxes, polymeric colorants and their derivatives, and colored isocyanate-derived mixed urea/urethane resins.

The phase change inks of the present invention are composed of two parts, namely, a colorant system portion and a phase change ink carrier or base portion.

The percentage of black colorant system to the phase change ink base is determined by the sufficient amount of black colorant system necessary to achieve the desired absorbance. The percentage of black colorant system to the ink base is from about 0.1 to about 7 parts per hundred parts by weight (0.1%–7%) and more preferably is from about 0.2 to about 4 parts per hundred parts by weight (0.2%–4%).

The colorant portion of the present invention preferably is made up of two or more dyes. One of those dyes is a black dye, such as Color Index (C.I.) Solvent Black 45. Other suitable dyes can include C.I. Solvent Black dyes 22, 27, 28, 29 and 35. The most preferred is C.I. Solvent Black 45. However, any black dyes may be acceptable that has the combination of properties of (1) solubility in the phase change ink base portion, (2) thermal stability, and (3) sufficiently lightfastness to be useful for medical imaging applications.

The other colorants of the colorant system of the present invention are primarily chosen because they provide increased absorbance in the deficient low absorbance region of the visible spectrum of the black colorants (i.e. at about 425 to about 525 nm for C.I. Solvent Black 45). Furthermore, these other colorants should also possess sufficient solubility in the phase change ink base portion; thermal stability, compatibility with the black colorant, non-migrating and lightfastness to be of utility in medical imaging applications. Furthermore, it is preferred that this additional colorant or colorants be environmentally safe and non-toxic, have Toxic Substance Control Act (TSCA) registration, be non-blooming, be tinctorially strong, and be commercially available. Two particular dyes, C.I. Disperse Orange 47 and C.I. Solvent Orange 60, are preferred as colorants.

When C.I. Disperse Orange 47 and C.I. Solvent Black 45 are used in combination, it has been found that the parts by weight ratio of C.I. Disperse Orange 47 to C.I. Solvent Black 45 is preferably from about 5 parts to about 10 parts of orange dye per 100 parts of black dye, more preferably, about 7 parts to about 8.5 parts of orange dye per 100 parts of black dye. It is believed that the ratios of the other suitable dyes would be adjusted dependent upon their individual tinctorial strengths.

Figure 4:
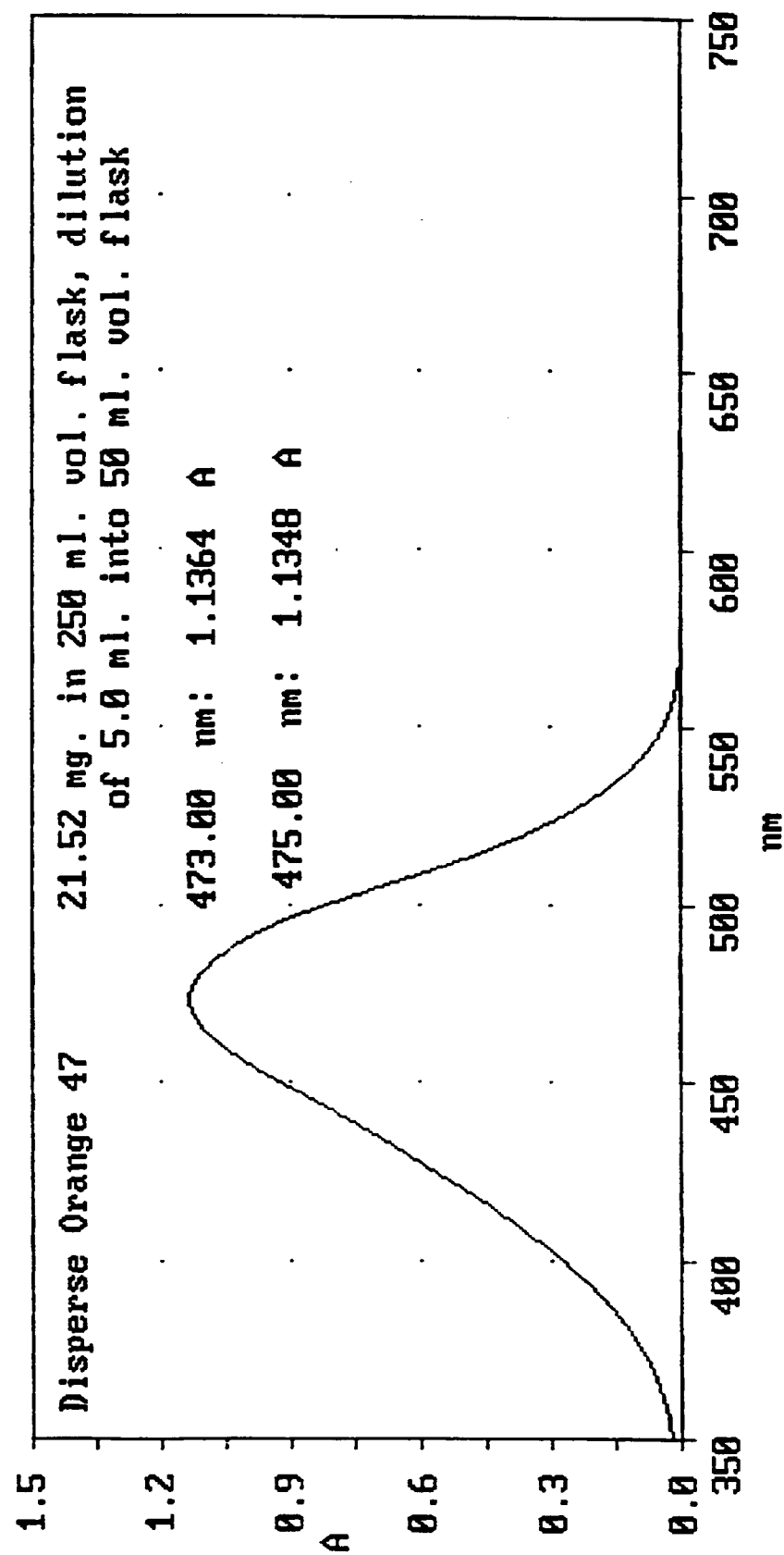
FIG. 4 is a graphical illustration of a visible absorbance spectrum of C.I. Disperse Orange 47 dye measuring relative absorbance versus wavelength and showing a high absorbance region between about 425 and about 525 nanometers or where the black dye is deficient in absorbance.
Figure 5:
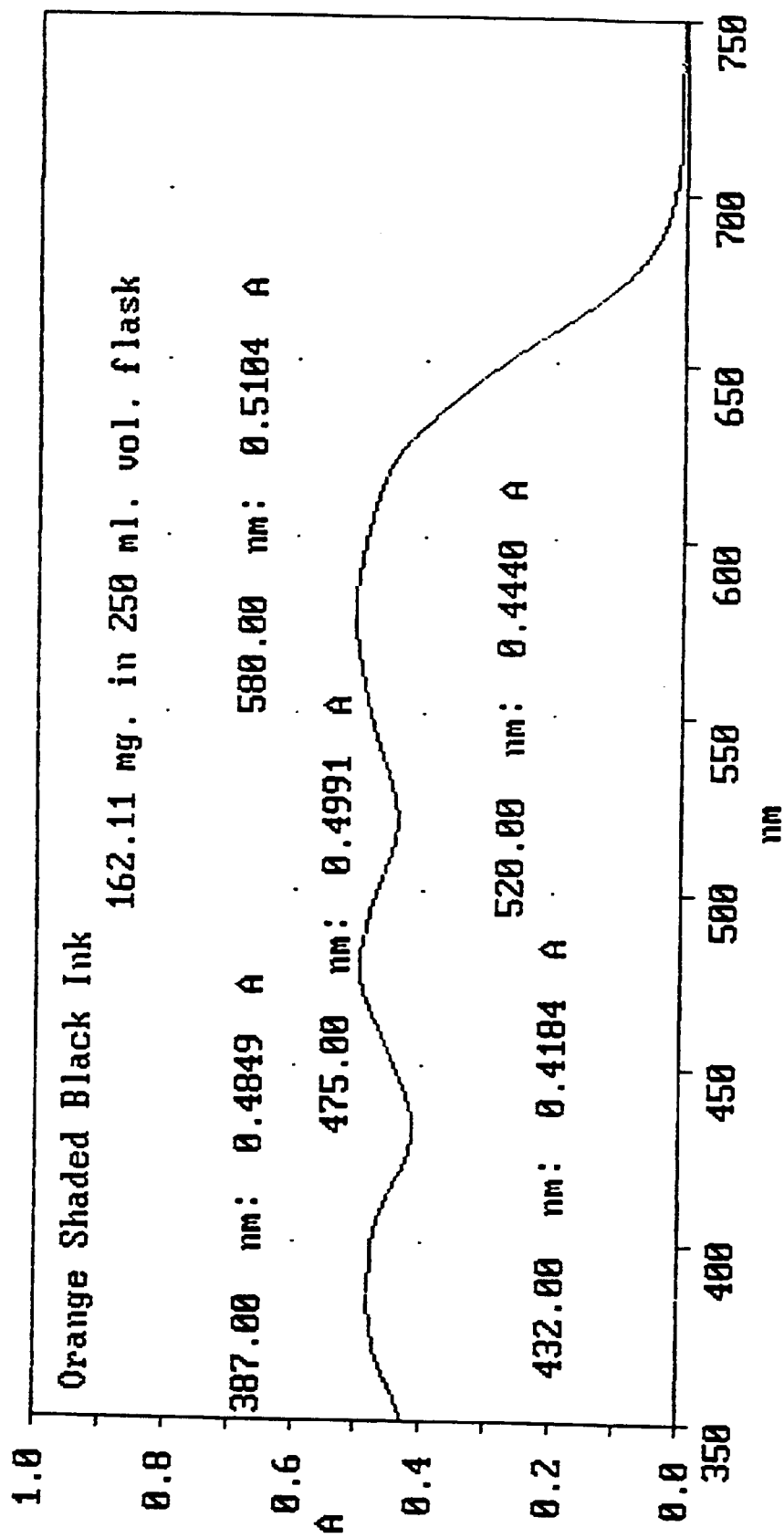
FIG. 5 is a graphical illustration of a visible absorbance spectrum of a phase change ink having the colorant system of the present invention measuring relative absorbance versus wavelength showing a generally uniform high absorbance in the visible spectrum between about 380 and about 630 nanometers.

The resulting absorbance of the colorant system in the phase change ink should be approximately equal throughout the visible spectrum from about 380 nm to about 630 nm (i.e. the absorbance in any one region will be not less than 80 percent of the absorbance in any other region). The functional approach is to balance out the absorbance between the high absorbance and low absorbance regions. This is illustrated in FIG. 5 wherein the individual dye absorbances in FIGS. 3 and 4 are combined, resulting in a substantially balanced absorbance across the portion of the visible spectrum to which humans respond. Furthermore, the ink of the present invention should possess all of the above recited desired properties of the colorants. Where pigments are employed as the colorant, a dispersant or surfactant may be used to prevent settling or aggregation of the pigments.

Any suitable phase change ink base system may be utilized for the ink composition of the present invention. Suitable phase change ink base systems include those described in U.S. Pat. No. 4,889,560 to Jaeger et al. and assigned to the assignee of the present invention.

In a preferred case, the phase change ink base compositions employed with the particular black inks of desired optical density comprise a tetra-amide and a functional mono-amide compound and a modifying agent which includes a tackifier, a plasticizer, and an antioxidant. The preferred compositional ranges of these phase change ink base composition are as follows: from about 10 to about 50 and most preferably from about 15 to about 30 percent by weight of a tetra-amide compound, from about 30 to about 80 and most preferably from about 40 to about 55 percent by weight of a mono-amide compound, from about 0 to about 40 and most preferably about 15 to about 35 weight percent of a tackifier, from about 0 to about 30 and most preferably about 4 to about 10 percent by weight of a plasticizer and about 0 to about 2 and most preferably 0.05 to about 1 percent by weight of an antioxidant. These phase change ink bases are described in further detail in U.S. Pat. No. 5,372,852, issued Dec. 13, 1994 and assigned to the assignee of the present invention.

The ink utilized in the process and system of the instant invention is preferably initially in solid form and is then changed to a molten state by the application of heat energy to raise the temperature from about 85° C. to about 150° C. Temperatures above this range will cause degradation or chemical breakdown of the ink over time. The molten ink is then applied in raster fashion from the ink jets in the print head to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forming the intermediate transfer surface on the support surface or drum. This intermediate temperature where the solidified ink is maintained in its malleable state is between about 30° C. to about 80° C.

Once the solid malleable ink image enters the nip, it is deformed to its final image conformation and adheres or is fixed to the final receiving substrate either by the pressure exerted against the ink image on the final receiving substrate by the pressure and fusing roller alone, or by the combination of the pressure and heat supplied by an appropriate heating apparatus. An additional heating apparatus could optionally be employed to supply heat to facilitate the process at this point. The pressure exerted on the ink image is between about 10 to about 2000 pounds per square inch (psi) and more preferably between about 200 to about 1000 psi. The pressure must be sufficient to have the ink image adhere to the final receiving substrate and be sufficiently deformed to ensure that light is transmitted through the ink image rectilinearly or without significant deviation in its path from the inlet to the outlet in those instances when the final receiving substrate is a transparency. Once adhered to the final receiving substrate, the ink image is cooled to an ambient temperature of about 20° to about 25° C. The ink forming the image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C. The indirect printing process described herein is described in greater detail in U.S. Pat. No. 5,389,958 issued Feb. 14, 1995 and assigned to the assignee of the present invention.

Another important property of phase change inks is viscosity. The viscosity of the molten ink must be matched to the requirements of the ink jet print head. For purposes of this invention, the viscosity of the phase change ink is measured on a Bohlin Model CS-50 Rheometer utilizing a cup and bob geometry. It is preferred that the viscosity of the phase change ink composition of the present invention, at about 140° C., is from about 10 to about 16 centipoise (cPs), and more preferably about 12 to about 14 cPs.

The viscosity of the preferred phase change ink composition can be adjusted by adding either more mono-amide or tetra-amide compound. Adding more mono-amide compound will reduce the viscosity, while adding more tetra-amide compound will increase the viscosity.

The final receiving substrate for use with the ink of the present invention can be a variety of media including permeable or impermeable, transparent, semi-transparent or opaque substrates. Where paper is used, the amount of ink deposited by the printer to achieve the same apparent optical density will be approximately half of the amount deposited on a transparent substrate, such as polyester film transparencies. This is because light passes through the ink on paper twice in reflective mode, both going away from and returning toward the eye. In contrast, with a transparency that is viewed in the transmittance mode, light passes through once going toward the eye. The greater dynamic range in the optical density for transparencies compared with reflection prints makes transparencies the preferred medium for medical diagnostic imaging providing distinguishably discernable useful gray levels. Paper has a limited maximum optical density range achievable in reflective mode viewing which does not permit sufficient levels of black to be achieved to be reliably useful in diagnostic applications. However, transparencies are the preferred medium for diagnostic imaging because they are capable of a greater range of optical density compared with reflection prints.

One preferred embodiment of the present invention permits multiple gray levels to be obtained by using inks with four different concentrations of colorant systems individually and mixed by overlapping printing. In this embodiment a clear ink using only the base without any of the black colorant system is used in combination with inks having three different percentages by weight of black dye; specifically about 0.41 percent by weight black dye, about 1.18 percent by weight black dye and about 3.15 percent by weight black dye. These dye percentages give inks of low, medium and high optical density black ink, respectively. All of the black inks include the same ratio of orange dye to black dye to obtain a more uniform absorbance across the visible spectrum. In this embodiment, C.I. Disperse Orange 47 dye and C.I. Solvent Black 45 dye are used together. They are used in the same ratio for all inks, preferably the ratio of C.I. Disperse Orange 47 dye to C.I. Solvent Black 45 dye is from about 0.070 to about 0.085 parts of orange to one part of black. This constant ratio of orange dye to black dye simulates the black color obtained in x-ray films using silver halide film for medical imaging. The composite black colorant system of the present invention can be employed whereby individual colorant components can be adjusted to give an absorbance spectrum comparable to that of an image on silver halide film. Preparation of the three level ink system, not including the clear ink, will have inks of different overall intensities, yet the individual colorant components will have a constant ratio to each other in each of the three inks. The different levels of colorants in the inks used herein allow the generation of multiple levels of optical density. A clear ink base without any black or orange dye is used in medical imaging applications to obtain the dynamic range in optical densities with low, medium and high optical density inks.

The following examples are illustrative of the phase change ink formulations that can be successfully employed both with and without a liquid intermediate transfer surface, without any intent to limit the invention to the specific materials, process or structure employed. All parts and percentages are by weight unless explicitly stated otherwise.

EXAMPLE 1

A plasticizer[1] (722 grams) and molten stearyl stearamide[2] (3746 grams, and an antioxidant[3] (16.00 grams) were added (in that order) to a pre-heated 110° C. stainless steel container. The components were then mixed with a propeller mixer and a rosin ester resin[4] (1781.92 grams) was slowly added to the mixture over 20 minutes, maintaining a mixture temperature of at least 100° C. A dimer acid-based tetra-amide[5] (1509.84 grams) was then added to the mixture over 15 minutes, while also maintaining a minimum mixture temperature of 100° C. The blend was allowed to mix for 1 hour until all the tetra-amide had dissolved. At this point, an orange dye[6] (16.08 grams) and a black dye[7] (208.01 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1]SANTICIZER 278, phthalate ester plasticizer manufactured by Monsanto Polymer Products Co. of St. Louis, Mo.
[2]KEMAMIDE S-180, stearyl stearamide manufactured by Witco Chemical Company of Memphis, Tenn.
[3]NAUGARD 445, antioxidant manufactured by Uniroyal Chemical Company of Middleberg, Conn.
[4]KE-100, glycerol ester of hydrogenated abietic (rosin) acid manufactured by Arakawa Chemical Industries Inc. of Osaka, Japan
[5]UNIREZ 2970, manufactured by Union Camp Corporation of Wayne, N.J.
[6]DISPERSE ORANGE 47 dye, commercially available from Keystone Aniline Corporation of Chicago, Ill.
[7]SOLVENT BLACK 45 dye, commercially available from Clariant Corporation of Charlotte, N.C.

A sample of this product was tested for spectral strength and the results are illustrated in FIG. 5. It was found to have 2.60% black dye and 0.197% orange dye in the filtered product. The viscosity of the ink was found to be 12.89 centipoise at 140° C. measured with a Bohlin Model CS-50 Rheometer using a cup and bob geometry. The ratio of absorbance at the 475 nanometer region to the 580 nanometer region for this ink was 0.978:1. Dynamic mechanical analyses (DMA) were obtained by using a Rheometrics Solids Analyzer (RSA II) manufactured by Rheometrics, Inc. of Piscataway, N.J. using a dual cantilever beam geometry to determine the following physical properties: glass transition temperature $(T_g)$=10.8° C.; storage modulus E'=2.5×10$^9$ dynes/cm$^2$ at 25° C. and 1.5×10$^9$ dynes/cm$^2$ at 50° C.; the integral of log tan δ was 25.4 from about −40° C. to about 40° C. The ink displayed a phase change transition of about 90° C. by the technique of differential scanning calorimetry (DSC) using a TA Instrument DSC 2910 Modulated DSC.

EXAMPLE 2

A plasticizer[1] (217.5 grams) and molten stearyl stearamide[2] (1382.9 grams), and an antioxidant[3] (5.4 grams) were added (in that order) to a pre-heated 110° C. stainless steel container. The components were then mixed with a propeller mixer and a rosin ester resin[4] (579.3 grams) was slowly added to the mixture over 20 minutes, maintaining a mixture temperature of at least 100° C. A dimer acid-based tetra-amide[5] (516.5 grams) was then added to the mixture over 15 minutes, while also maintaining a minimum mixture temperature of 100° C. The blend was allowed to mix for 1 hour until all the tetra-amide had dissolved. At this point, an orange dye[6] (6.8 grams) and a black dye[7] (88.4 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1]SANTICIZER 278, phthalate ester plasticizer manufactured by Monsanto Polymer Products Co. of St. Louis, Mo.
[2]KEMAMIDE S-180, stearyl stearamide manufactured by Witco Chemical Company of Memphis, Tenn.
[3]NAUGARD 445, antioxidant manufactured by Uniroyal Chemical Company of Middleberg, Conn.
[4]KE-100, glycerol ester of hydrogenated abietic (rosin) acid manufactured by Arakawa Chemical Industries Inc. of Osaka, Japan
[5]UNIREZ 2970, manufactured by Union Camp Corporation of Wayne, N.J.
[6]DISPERSE ORANGE 47 dye, commercially available from Keystone Aniline Corporation of Chicago, Ill.
[7]SOLVENT BLACK 45 dye, commercially available from Clariant Corporation of Charlotte, N.C.

A sample of this product was tested for spectral strength. It was found to have 3.081% black dye and 0.227% orange dye in the filtered product. The ratio by weight of the orange dye to the black dye was 0.074 to 1.0. The viscosity of the ink was found to be 12.88 centipoise at 140° C. measured with a Bohlin Model CS-50 Rheometer using a cup and bob geometry. The ratio of absorbance at the 475 nanometer region to the 580 nanometer region for this ink was 0.970:1. Dynamic mechanical analyses (DMA) were obtained by using a Rheometrics Solids Analyzer (RSA II) manufactured by Rheometrics, Inc. of Piscataway, N.J. using a dual cantilever beam geometry to determine the following physical properties: glass transition temperature $(T_g)$=10.8° C.; storage modulus E'=2.3×10$^9$ dynes/cm$^2$ at 25° C. and 1.4× 10$^9$ dynes/cm$^2$ at 50° C.; the integral of log tan δ was 25.2 from about −40° C. to about 40° C. The ink displayed a phase change transition of about 90° C. by the technique of differential scanning calorimetry (DSC) using a TA Instrument DSC 2910 Modulated DSC.

EXAMPLE 3

A plasticizer[1] (226.8 grams) and molten stearyl stearamide[2] (1229.7 grams), and an antioxidant[3] (5.4 grams) were added (in that order) to a pre-heated 110° C. stainless steel container. The components were then mixed with a propeller mixer and a rosin ester resin[4] (668.6 grams) was slowly added to the mixture over 20 minutes, maintaining a mixture temperature of at least 100° C. A dimer acid-based tetra-amide[5] (567.8 grams) was then added to the mixture over 15 minutes, while also maintaining a minimum mixture temperature of 100° C. The blend was allowed to mix for 1 hour until all the tetra-amide had dissolved. At this point, an orange dye[6] (2.5 grams) and a black dye[7] (33.0 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1]SANTICIZER 278, phthalate ester plasticizer manufactured by Monsanto Polymer Products Co. of St. Louis, Mo.
[2]KEMAMIDE S-180, stearyl stearamide manufactured by Witco Chemical Company of Memphis, Tenn.
[3]NAUGARD 445, antioxidant manufactured by Uniroyal Chemical Company of Middleberg, Conn.
[4]KE-100, glycerol ester of hydrogenated abietic (rosin) acid manufactured by Arakawa Chemical Industries Inc. of Osaka, Japan
[5]UNIREZ 2970, manufactured by Union Camp Corporation of Wayne, N.J.
[6]DISPERSE ORANGE 47 dye, commercially available from Keystone Aniline Corporation of Chicago, Ill.
[7]SOLVENT BLACK 45 dye, commercially available from Clariant Corporation of Charlotte, N.C.

A sample of this product was tested for spectral strength. It was found to have 1.21% black dye and 0.086% orange dye in the filtered product. The ratio by weight of the orange dye to the black dye was 0.071 to 1.0. The viscosity of the ink was found to be 12.78 centipoise at 140° C. measured in a Bohlin Model CS-50 Rheometer using a cup and bob geometry. The ratio of absorbance at the 475 nanometer region to the 580 nanometer region for this ink was 0.957:1. Dynamic mechanical analyses (DMA) obtained by using a Rheometrics Solids Analyzer (RSA II) manufactured by Rheometrics, Inc. of Piscataway, N.J. using a dual cantilever beam geometry to determine the following physical properties: glass transition temperature ($T_g$)=9.0° C.; storage modulus E'=2.3×10$^9$ dynes/cm$^2$ at 25° C. and 1.2×10$^9$ dynes/cm$^2$ at 50° C.; the integral of log tan δ was 27.6 from about −40° C. to about 40° C. The ink displayed a phase change transition of about 92° C. by the technique of differential scanning calorimetry (DSC) using a TA Instrument DSC 2910 Modulated DSC.

EXAMPLE 4

A plasticizer[1] (212.5 grams) and molten stearyl stearamide[2] (1180.2 grams), and an antioxidant[3] (5.4 grams) were added (in that order) to a pre-heated 110° C. stainless steel container. The components were then mixed with a propeller mixer and rosin ester resin[4] (689.0 grams) was slowly added to the mixture over 20 minutes, maintaining a mixture temperature of at least 100° C. A dimer acid-based tetra-amide[5] (614.8 grams) was then added to the mixture over 15 minutes, while also maintaining a minimum mixture temperature of 100° C. The blend was allowed to mix for 1 hour until all the tetra-amide had dissolved. At this point, an orange dye[6] (0.9 grams) and a black dye[7] (11.1 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1]SANTICIZER 278, phthalate ester plasticizer manufactured by Monsanto Polymer Products Co. of St. Louis, Mo.
[2]KEMAMIDE S-180, stearyl stearamide manufactured by Witco Chemical Company of Memphis, Tenn.
[3]NAUGARD 445, antioxidant manufactured by Uniroyal Chemical Company of Middleberg, Conn.
[4]KE-100, glycerol ester of hydrogenated abietic (rosin) acid manufactured by Arakawa Chemical Industries Inc. of Osaka, Japan
[5]UNIREZ 2970, manufactured by Union Camp Corporation of Wayne, N.J.
[6]DISPERSE ORANGE 47 dye, commercially available from Keystone Aniline Corporation of Chicago, Ill.
[7]SOLVENT BLACK 45 dye, commercially available from Clariant Corporation of Charlotte, N.C.

A sample of this product was tested for spectral strength. It was found to have 0.42% black dye and 0.032% orange dye in the filtered product. The ratio by weight of the orange dye to the black dye was 0.076 to 1.0. The viscosity of the ink was found to be 12.83 centipoise at 140° C. measured with a Bohlin Model CS-50 Rheometer using a cup and bob geometry. The ratio of absorbance at the 475 nanometer region to the 580 nanometer region for this ink was 0.983:1. Dynamic mechanical analyses (DMA) were obtained by using a Rheometrics Solids Analyzer (RSA II) manufactured by Rheometrics, Inc. of Piscataway, N.J. using a dual cantilever beam geometry to determine the following physical properties: glass transition temperature ($T_g$)=9.5° C.; storage modulus E'=2.3×10$^9$ dynes/cm$^2$ at 25° C. and 1.2×10$^9$ dynes/cm$^2$ at 50° C.; the integral of log tan δ was 27.7 from about −40° C. to about 40° C. The ink displayed a phase change transition of about 93° C. by the technique of differential scanning calorimetry (DSC) using a TA Instrument DSC 2910 Modulated DSC.

EXAMPLE 5

A clear ink unshaded with any colorant system was prepared according to the following procedure and used to obtain the dynamic range in optical densities when employed in an ink jet printer with black shaded low, medium, and high optical density inks. A plasticizer[1] (207.9 grams) and molten stearyl stearamide[2] (1169.7 grams), and an antioxidant[3] (5.4 grams) were added (in that order) to a pre-heated 110° C. stainless steel container. The components were then mixed with a propeller mixer and a rosin ester resin[4] (711.0 grams) was slowly added to the mixture over 20 minutes, maintaining a mixture temperature of at least 100° C. A dimer acid-based tetra-amide[5] (605.8 grams) was then added to the mixture over 15 minutes, while also maintaining a minimum mixture temperature of 100° C. The blend was allowed to mix for 1 hour until all the tetra-amide had dissolved. The clear ink was then passed through a 2.0 micron filter (Pall Filter P/N PFY1U2-20ZJ, S/N 416) under approximately 5 psi of nitrogen pressure.

[1]SANTICIZER 278, phthalate ester plasticizer manufactured by Monsanto Polymer Products Co. of St. Louis, Mo.
[2]KEMAMIDE S-180, stearyl stearamide manufactured by Witco Chemical Company of Memphis, Tenn.
[3]NAUGARD 445, antioxidant manufactured by Uniroyal Chemical Company of Middleberg, Conn.
[4]KE-100, glycerol ester of hydrogenated abietic (rosin) acid manufactured by Arakawa Chemical Industries Inc. of Osaka, Japan
[5]UNIREZ 2970, manufactured by Union Camp Corporation of Wayne, N.J.

The viscosity of the clear ink was found to be 12.79 centipoise at 140° C. measured with a Bohlin Model CS-50 Rheometer CS-50 using a cup and bob geometry. Dynamic mechanical analyses (DMA) were obtained by using a Rheometrics Solids Analyzer (RSA II) manufactured by Rheometrics, Inc. of Piscataway, N.J. using a dual cantilever beam geometry to determine the following physical properties: glass transition temperature ($T_g$)=11.1° C.; storage modulus E'=2.1×10$^9$ dynes/cm$^2$ at 25° C. and 1.1×10$^9$ dynes/cm$^2$ at 50° C.; the integral of log tan δ was 27.0 from about −40° C. to about 40° C. The ink displayed a phase change transition of about 94° C. by the technique of differential scanning calorimetry (DSC) using a TA Instrument DSC 2910 Modulated DSC.

The following procedures were used to obtain the visible absorbance spectra of the ink samples in the Examples and for determining the dye content of those samples.

A solution of the orange shaded black ink was prepared by weighing about 0.16211 grams of the ink of Example 1 and graphically illustrated in FIG. 5 into a 250 mL volumetric flask. The ink was dissolved in n-butanol. When the ink was completely dissolved, the volumetric flask was filled to volume with n-butanol. The solution was thoroughly mixed. The absorbance spectrum of the sample was measured against a reference cell containing the solvent, n-butanol, in a dual beam Perkin-Elmer Lambda 2S UV-Visible Spectrometer scanning from 350 nm to 750 nm. The absorbances at 580 nm and 475 nm were used to calculate the actual amounts of the two dyes incorporated into the ink after filtering.

Determination of Black Dye Content in Inks Containing the Black Colorant System In the visible absorbance spectrum of the ink of Example 1 and graphically illustrated in FIG. 5, the absorbance at 580 nm is 0.5104 for 0.16211 grams of the ink sample in 250.0 mL of n-butanol. The spectral strength was 787 mL A/gram (where A=absorbance). A commercially available black ink for the Phaser® 340 and 350 color printers containing 2.344% C.I. Solvent Black 45 dye has a spectral strength of 710 mL A/gram. Therefore the ink of Example 1 and graphically illustrated in FIG. 5 contains 787/710×2.344%, or 2.60% black dye.

Determination of Orange Dye Content in Inks Containing the Black Colorant System The absorbance at 580 nm in the visible spectrum of the ink in Example 1 is 0.5104, and is due entirely to the black dye. No portion of the orange dye absorbs in this region of the spectrum. The ink containing only black dye has an absorbance at 475 nm that is 64.82% of its 580 nm absorbance (see FIG. 3). Therefore the absorbance at 475 nm in the spectrum (see FIG. 5) attributable to the black dye is 0.5104 times 0.6482 or 0.3308. Since the absorbance in the visible spectrum of the ink of Example 1 and graphically illustrated in FIG. 5 is actually 0.4991, the additional absorbance is due entirely to the amount of orange dye that is present, or 0.4991−0.3308=0.1683. The orange dye (see FIG. 4) was determined from using the aforementioned spectrometer to have an absorbance of 0.527 for every 1 mg of dye in 250 mL of n-butanol. Therefore, the amount of the orange dye in the black colorant system must be 0.1683/0.527=0.319 mg. A sample size of 162.11 mg of the ink of Example 1 was used to generate the visible spectrum (see FIG. 5). Therefore the orange content of the sample of the ink of Example 1 and as graphically illustrated in FIG. 5 is 0.319 mg divided by 162.11 mg or 0.197% orange dye in the black ink. The ratio of orange to black dyes as shown in FIG. 5 is 0.197 to 2.60 or 0.076 to 1.00.

Thermal Stability Testing

An ink the same as described in Example 1 above was heated for 408 hours in a glass beaker with a simulated print head reservoir in an oven at about 145° C. The spectral strength (milliliters Absorbance per gram) decreased from about 771 to 645 or alternatively, the ink lost about 16.3% of its initial dye strength. This compares very favorably with actual operating conditions where it can be expected that the ink would be subjected to the elevated operating temperature in the print head of about 140° C. for at most and routinely less than about 8 hours.

Compatibility Testing

The black and orange dyes from Examples 1–4 were found to be mutually compatible when used in a Tektronix Phaser® 350 printer with a modified print head in which the cyan, yellow, magenta and black colors were replaced by the clear, low, medium and high optical density inks of Examples 5, 4, 3 and 2, respectively. No clogging of any of the orifices of the ink jet print head was observed, even with multiple purging/wiping cycles in the printer or even with extended dwell time of the test inks in the printers.

No reaction occurred among these inks and no precipitates were formed in the inks on or around the print head surface during multiple normal purging cycles while the printer was in operation.

Adhesion Durability Testing

Samples of the inks in Examples 1–5 and a commercially available black ink used in a Tektronix Phaser® 350 color printer were tested for adhesion durability on transparent films or substrates routinely used for fluorescent lightbox viewing in medical diagnoses as follows. The first set of data is for a sample that was imaged twice, first with the ink of Example 1 and then with the ink of Example 3 to achieve 125% coverage of the imaged area. The remaining samples were imaged just once with the indicated ink of high, medium, low and clear optical density, and with commercially available black ink to compare adhesion to the transparent film substrate.

A small test fixture that holds tautly a 1.9" square imaged sample of a 100% solid fill phase change ink on a transparency final receiving substrate was utilized for each test. A round approximately ½ inch diameter and approximately ¼ inch raised plastic head mounted on a flat metal spring impacts the media or non-imaged side of the sample centered vertically and just above the midpoint. The hammer is driven by a 3–5 inch long, $\frac{7}{16}$ inch wide and about 0.0035 inch tick metal spring that is cocked back about 1 inch using a trigger and release method. The sample is secured by two upright poles on either side that clamp the sample along the entire length of each side by sandwiching the sample between the upright and another piece of bracket. The amount of ink remaining on the imaged transparency substrate after impact is determined by use of a software image analysis program and a flat bed scanner that first scans a selected area (a 1.46×1.09" rectangle) of the hammer impacted image at a resolution of 439 dots per inch and then analyzes the scanned area. The software program then calculates the percentage of ink that has been removed from the scanned rectangular area which permits an interpolation to be done to provide the percentage of ink remaining on the transparency substrate as shown in Table 1.

Gouge Durability Testing

Durability testing for gouging of solid fill phase change ink imaged transparency substrates using samples of the inks and printing method for the samples described above for adhesion durability testing was performed as follows. A variable weight gouge test fixture was employed which is composed of three arms with weighted gouge fingers and a metal plate to which a print sample is secured. The metal plate moves the imaged print beneath the gouge fingers.

A print with a 100% solid fill image (at least 10" long and wide enough for up to six interlaced scratch passes of the gouge fingers, each pass about 2 inches in width) on transparency substrate was secured to the metal moveable plate so the gouge was along the length of the substrate on the ink image side. The three gouge fingers have a net weight of 924, 660, and 396 grams, respectively, during the first gouge. Each gouge finger is 0.5" wide by 1.245" long with a point of contact curve equivalent to a 0.995" diameter disc. The disc is free of any ink particulate prior to all gouging. The gouge fingers are gently lowered at one end of the imaged portion of the substrate so that the gouge finger edges make a contact angle of approximately 75° along the leading edge of the gouge and approximately 15° along the trailing edge (i.e. the image was pulled against the gouge fingers, not pushed). The moveable metal plate was advanced for 9±1/32 inches at a speed of 0.45±0.05 inches/second. A second gouge was performed on the transparencies on the same print samples with the three gouge fingers containing a net weight of 1188, 1056, and 792 grams, respectively.

The sum of the areas of the resulting six gouges for each transparency media are measured in $mm^2$ using the flat bed scanner and imaging analysis software system described above with respect to adhesion durability testing. The area with ink removed is shown in Table 1.

TABLE 1

|  |  | Example 1/3 High/Inter 125% fill | Example 2 High Optical Density | Example 3 Intermediate Optical Density | Example 4 Low Optical Density | Example 5 Clear | Phaser ® 350 printer black ink |
|---|---|---|---|---|---|---|---|
| Adhesion Durability (Higher is Better) | % | 99.85 | 99.87 | 99.86 | 100.00 | 100.00 | 96.56 |
| Gouge Resistance (Lower is Better) | $mm^2$ | 2481.42 | 2406.78 | 2243.97 | 2232.62 | — | 3433.02 |

The results show that the black shaded inks in Examples 2–4 and the clear ink in Example 5 provide better adhesion durability on transparency media than the current commercially available black Tektronix Phaser® 350 ink and the twice imaged or over-printed sample, and that the black shaded inks in Examples 2–4 also display better gouge resistance.

Having illustrated and described the principles of our invention in a preferred embodiment thereof, it should be readily apparent to those skilled in the art that the invention can be modified in arrangement and detail without departing from such principles. For example, the ink base or carrier composition to form the ink composition of the present invention can be a low viscosity semicrystalline or crystalline amide wax, an ester wax, a polyethylene wax, a microcrystalline wax or a paraffin in combination with a hydrocarbon or resin based amorphous material, or an oligomer, or low molecular weight polymer or copolymer, or a tackifier, or a plasticizer and combinations thereof In addition, the phase change ink base or carrier composition can comprise isocyanate-derived urethane resins, isocyanate-derived urethane/urea mixed resins, isocyanate-derived urethane waxes, and combinations thereof as disclosed in co-pending U.S. patent application Ser. Nos. 08/672,815 entitled "Phase Change Ink Formulation Using Urethane and Urethane/Urea Isocyanate Derived Resins," filed Jun. 28, 1996 and 08/907, 805, entitled "Phase Change Ink Formulation Using an Isocyanate-Derived Wax and a Clear Ink Carrier Base, filed Aug. 8, 1997, both assigned to the assignee of the present invention. The combination of the ink carrier or base composition and the compatible black colorant system can be used with either a direct printing or an indirect transfer or offset printing printer. Also the phase change inks employing the colorant system of the present invention can be use in conjunction with an adhesion promoting coating that is applied to the transparent substrate prior to imaging. All patents and patent applications referenced herein are hereby specifically incorporated by reference in pertinent part. We claim all modifications coming within the spirit and scope of the accompanying claims.

What is claimed:

1. A method of printing a medical image on a transparent substrate comprising the steps of:
   a. creating an image on an intermediate support surface using a plurality of inks each having a lightfast compatible black colorant system and an ink base, each compatible black colorant system having in combination
      1. a black colorant characterized by a broad absorbance band throughout the human visible spectrum and having at least one low absorbance region and at least one high absorbance region within the visible spectrum;
      2. at least one other colorant having an absorbance band in the low absorbance region of the black colorant, the black colorant and the at least one other colorant being compatible with each other; and
   b. transferring the image from the intermediate support surface to the transparent substrate.

2. The method of printing according to claim 1 further including the step of fusing the transferred image to the transparent substrate.

3. The method of printing according to claim 2 further including the step of using phase change inks as the plurality of inks to create the medical image.

4. The method of printing according to claim 3 further including the step of using a clear phase change ink in combination with the plurality of inks to create the medical image.

5. The method of printing according to claim 4 further including the step of using a black colorant in each of the black inks wherein the black colorant is a colorant selected from the group consisting of a dye, a pigment, a polymeric colorant, a wax, and combinations thereof.

6. The method of printing according to claim 5 further including the step of using at least one other colorant in each of the black inks wherein the at least one other colorant is a colorant selected from the group consisting of a dye, a pigment, a polymeric colorant, a wax, and combinations thereof.

7. The method of printing according to claim 6 further including the step of using a dye as the black colorant.

8. The method of printing according to claim 7 further including the step of using a dye as the at least one other colorant.

9. The method of printing according to claim 8 wherein the step of using a black dye as the colorant further includes selecting the dye from the group consisting of C.I. Solvent Black 22, C.I. Solvent Black 27, C.I. Solvent Black 28, C.I. Solvent Black 29, C.I. Solvent Black 35 and C.I. Solvent Black 45.

10. The method of printing according to claim 9 wherein the step of using a black dye as the colorant further includes selecting C.I. Solvent Black 45 as the dye.

11. The method of printing according to claim 10 wherein the step of using at least one other dye colorant further includes selecting C.I. Disperse Orange 47 as the at least one other colorant.

12. The method of printing according to claim 11 wherein the step of creating a medical image with a plurality of black inks further includes using in each black ink colorant system an amount of C.I. Disperse Orange 47 dye that is from about 5 parts to about 10 parts per 100 parts by weight of C.I. Solvent Black 45 dye.

13. The method of printing according to claim 12 wherein the step of creating a medical image with a plurality of black inks further includes using in each black ink an amount of the black colorant system that is from about 0.2 to about 4 parts by weight per 100 parts by weight phase change ink base system.

14. The method of printing according to claim 13 wherein the step of creating a medical image with a plurality of inks further includes using in each ink a phase change ink base that comprises:

a. about 10 to about 50 percent by weight of at least one tetra-amide compound;

b. about 30 to about 80 percent by weight of at least one mono-amide compound;

c. zero to about 40 percent by weight of at least one tackifier;

d. zero to about 30 percent by weight of at least one plasticizer; and e. zero to about 2 percent by weight of at least one antioxidant based on the total weight of the phase change ink base.

15. The method of printing according to claim 13 wherein the step of creating a medical image with a plurality of inks further includes using in each ink a phase change ink base that includes at least one isocyanate-derived resin.

16. The method of printing according to claim 15 wherein the step of creating a medical image with a plurality of inks further includes using in each ink a phase change ink base wherein the isocyanate-derived resin in the phase change ink base comprises a mixed urea/urethane resin.

17. The method of printing according to claim 16 wherein the step of creating a medical image with a plurality of inks further includes using in each ink a phase change ink base wherein the isocyanate-derived resin in the phase change ink base further includes a urethane resin.

18. The method of printing according to claim 1, wherein the black colorant has a broad absorbance band throughout 380 to 670 nanometers.

* * * * *